United States Patent
Seki

(10) Patent No.: US 7,898,216 B2
(45) Date of Patent: Mar. 1, 2011

(54) RECHARGEABLE BATTERY DEVICE HAVING A PROTECTION CIRCUIT FOR PROTECTING FROM OVERCHARGE AND OVERDISCHARGE

(75) Inventor: Masahiro Seki, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 870 days.

(21) Appl. No.: 11/797,125

(22) Filed: May 1, 2007

(65) Prior Publication Data

US 2007/0216351 A1  Sep. 20, 2007

(30) Foreign Application Priority Data

May 2, 2006  (JP) .............................. 2006-128296

(51) Int. Cl.
*H02J 7/00* (2006.01)
(52) U.S. Cl. ....................... 320/134; 320/137; 320/162; 320/163
(58) Field of Classification Search ................... 320/134
See application file for complete search history.

(56) References Cited

U.S. PATENT DOCUMENTS

2005/0077878 A1* 4/2005 Carrier et al. ............... 320/134
2005/0242779 A1* 11/2005 Yoshio ....................... 320/134
2006/0097765 A1* 5/2006 Asada ......................... 327/172

FOREIGN PATENT DOCUMENTS

JP  2001-126772 A  5/2001
JP  2001-176561 A  6/2001

\* cited by examiner

*Primary Examiner*—Edward Tso
*Assistant Examiner*—Arun Williams
(74) *Attorney, Agent, or Firm*—Westerman, Hattori, Daniels & Adrian, LLP

(57) ABSTRACT

Charging and discharging lines for a rechargeable battery are arranged independently from each other, and as a protection circuit for the rechargeable battery, there are provided a non-return-type switch (for example, thermo-fuse with an internal heater) that is interposed in the charging line in series and interrupts the charging line by blowout and a semiconductor switch (for example, MOS-FET) that is interposed in the discharging line in series and electrically continues or interrupts the discharging line. The switch control circuit turns off the semiconductor switch element when detecting overdischarge of the rechargeable battery, and blows out the nonreturn-type switch when detecting overcharge of the rechargeable battery or a malfunction of the semiconductor switch element.

4 Claims, 1 Drawing Sheet

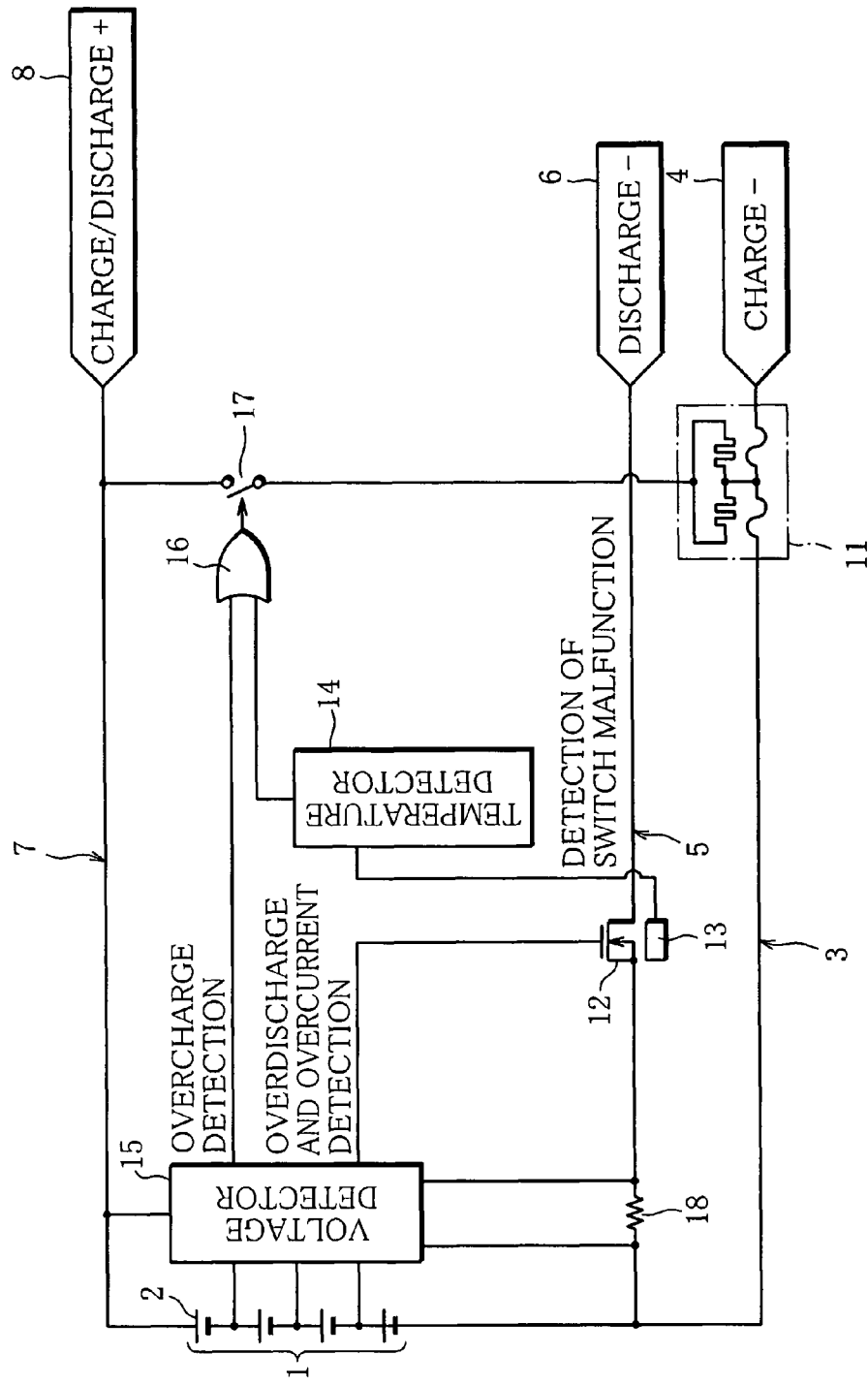

RECHARGEABLE BATTERY DEVICE HAVING A PROTECTION CIRCUIT FOR PROTECTING FROM OVERCHARGE AND OVERDISCHARGE

BACKGROUND OF THE INVENTION

1. Field of the Invention

The present invention relates to a rechargeable battery device having an overcharge protection function and an overdischarge protection function for a rechargeable battery and having a simple structure in which safety is ensured.

2. Description of the Related Art

A rechargeable battery, such as a Lithium-ion battery and a Nickel-Metalhalide battery, is deteriorated in battery characteristics by overcharge. Overdischarge of the rechargeable battery has the possibility of decreasing the safety of the battery. Likewise, if the discharge current of the rechargeable battery exceeds its rated value, the safety is possibly decreased by abnormal heat generation of the battery.

Given these factors, for example, as disclosed in Unexamined Japanese Patent Publication No. 2001-126772, a semiconductor switch element (for example, MOS-FET) that electrically continues or interrupts a charging/discharging line of a rechargeable battery is conventionally interposed in the charging/discharging line in series. When the charge voltage of the rechargeable battery exceeds overcharge protection voltage or when the discharge current of the battery exceeds rated current, the semiconductor switch element is turned off so that the charge and discharge are forbidden. As a countermeasure against a failure of the semiconductor switch element, the charging/discharging line is further interposed with a thermo-fuse (nonreturn-type switch) in series as disclosed, for example, in Unexamined Japanese Patent Publication No. 2001-176561. The charging/discharging line is interrupted by blowing out the thermo-fuse in the event of a failure of the semiconductor switch element.

When overcharge of the rechargeable battery is detected, however, if the thermo-fuse interposed in the charging/discharging line is operated, the electric energy stored in the rechargeable battery cannot be recovered through the charging/discharging line. There is another idea that charging and discharging lines for the rechargeable battery are arranged independently from each other, and that each of the lines is provided with the semiconductor switch element and the thermo-fuse. The fact is, however, that a high-current thermo-fuse (nonreturn-type switch) has not been created, which is suitable for the discharge current to be supplied to load with large rated current, such as a machine tool and a battery-assisted bicycle.

Conventionally, the charge voltage of the rechargeable battery and the charge and discharge currents of the battery are detected, and the temperature of the semiconductor switch element is monitored. When a malfunction of the rechargeable battery or of the semiconductor switch element is detected from the monitoring information, a malfunction detection signal is transmitted through communication means to the load provided with a charger or the like, and the charge and discharge of the rechargeable battery are forbidden at the load (charger) side. If such a countermeasure is taken, the rechargeable battery device becomes especially complicated in structure, so that it is undeniable that the battery costs high.

SUMMARY OF THE INVENTION

It is an object of the present invention to provide a rechargeable battery device with a simple structure which prevents an abnormal overcharge and overdischarge of a rechargeable battery and forbids an undesirable continuous use of a semiconductor switch element in the event of a failure of the element to ensure safety thereof.

In order to achieve the object, the rechargeable battery device according to the present invention includes a rechargeable battery such as Lithium-ion battery and a protection circuit for protecting the rechargeable battery from overcharge and overdischarge. Especially, <a> charging and discharging lines for the rechargeable battery are arranged independently from each other; and <b> there are provided as the protection circuit, <b1> a nonreturn-type switch (for example, a thermo-fuse with an internal heater) that is interposed in the charging line in series and interrupts the charging line by blowout, <b2> a semiconductor switch (for example, MOS-FET) that is interposed in the discharging line in series and electrically continues or interrupts the discharging line, and <b3> a switch control circuit that turns off the semiconductor switch element when detecting overdischarge of the rechargeable battery, and operates the nonreturn-type switch when detecting a malfunction of the rechargeable battery device.

A malfunction of the rechargeable battery device is a malfunction of the semiconductor switch element, and is detected by measuring heat temperature of the semiconductor switch element which is obtained by using a thermo-sensor provided to the semiconductor switch element. The rechargeable battery device thus constructed is suitable for a three-terminal battery pack having, for example as external connection terminals, a charging terminal connected to one electrode of the rechargeable battery through the charging line, a discharging terminal that is connected to the one electrode of the rechargeable battery through the discharging line and arranged independently from the charging terminal, and a common terminal that is connected to the other electrode of the rechargeable battery and makes a pair both with the charging terminal and the discharging terminal.

According to the rechargeable battery device thus constructed, in the event of a malfunction, for example, when overcharge of the rechargeable battery is detected or when the semiconductor switch element for protecting the rechargeable battery from overdischarge fails to operate properly, the nonreturn-type switch (for example, thermo-fuse with an internal heater) that is interposed in the charging line of the rechargeable battery in series is blown out. Therefore, a further charge of the rechargeable battery can be reliably avoided. However, since the discharging line of the rechargeable battery is provided independently from the charging line, electric energy charged into the rechargeable battery is recovered through the discharging line and can be supplied to given load. Accordingly, the charged energy is not wastefully used, and it is possible to prevent a problem that the rechargeable battery is discarded in a charged state.

Stated differently, according to the present invention, it is possible to prevent a problem that the rechargeable battery deteriorated in characteristics due to overcharge or the rechargeable battery in which the semiconductor switch element interposed in the discharging line is broken is repeatedly charged and used, and to ensure safety thereof. Moreover, in the event of a malfunction of the rechargeable battery device, for example, when a failure of the semiconductor switch element interposed in the discharging line of the rechargeable battery is detected, undesirable use (recharge) of the rechargeable battery device can be prevented, and also the safety thereof can be fully ensured only by simple control and structure that blows out the nonreturn-type switch interposed in the charging line of the rechargeable battery.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGURE is a schematic configuration view of a rechargeable battery device according to one embodiment of the present invention.

DETAILED DESCRIPTION OF THE PREFERRED EMBODIMENTS

A rechargeable battery device according to one embodiment of the present invention will be described below with reference to the attached drawing.

The rechargeable battery device is used being mounted on an electronic device such as a laptop personal computer and is formed mainly of a rechargeable battery, such as a Lithium-ion battery and a Nickel-Metalhalide battery. Specifically, the rechargeable battery device is so constructed that the rechargeable battery is charged by a power source device that is built-in in the electronic device, and that electric energy stored in the rechargeable battery is supplied to electric load, such as a CPU and a memory, in the electronic device through the power source device.

FIGURE shows a schematic configuration of the rechargeable battery device as described. Reference numeral 1 represents the rechargeable battery. The rechargeable battery 1 is constructed as battery group that maintains given cell voltage and capacity corresponding to specifications of the electric load, for example, by connecting a plurality of battery cells 2 in series/parallel. A negative electrode of the rechargeable battery 1 is connected to a charging terminal 4 through a first negative power source line 3 forming a charging line, and is also connected to a discharging terminal 6 through a second negative power source line 5 forming a discharging line. A positive electrode of the rechargeable battery 1 is connected to a common terminal 8 through a positive power source line 7 that is used both for charge and discharge.

In other words, in the rechargeable battery device, the charging and discharging lines of the rechargeable battery are arranged independently from each other by forming the charging line for the rechargeable battery 1 as a power source line formed in between the charging terminal 4 and the common terminal 8 and forming the discharging line as a power source line formed in between the discharging terminal 6 and the common terminal 8. The description in this specification is about the case in which the negative power source lines are separated into the charging and discharging lines. However, it is naturally possible to arrange the charging and discharging lines independently from each other by separating the positive power source line into charging and discharging lines.

As stated above, the rechargeable battery device in which the charging and discharging lines for the rechargeable battery 1 are arranged independently from each other is constructed by interposing a nonreturn-type switch 11 for protecting the rechargeable battery 1 from overcharge in the charging line 3 in series and interposing a semiconductor switch element 12 for protecting the rechargeable battery 1 from overdischarge in the discharging line 4 in series as a protection circuit of the rechargeable battery 1. The nonreturn-type switch 11 is made up, for example, of a thermo-fuse with an internal heater, and has a function of interrupting the charging line 3 by blowout. Therefore, by operating the nonreturn-type switch 11, the charging line 3 is interrupted so that re-continuation (return) is impossible.

The semiconductor switch element 12 is formed, for example, of a MOS-FET for power switching. The semiconductor switch element 12 has a function of selectively continuing or interrupting the discharging line 5 by turning on/off a source-drain line using a control signal applied to a gate thereof. In other words, the discharging line 5 is continued or interrupted by selective control of operation of the semiconductor switch element 12 using the control signal. The semiconductor switch element 12 is provided with a thermo-sensor 13 that is thermally united with the semiconductor switch element 12. A temperature detector 14 mentioned below detects a thermal destruction (damage) of the semiconductor switch element 12 from output (temperature information) of the thermo-sensor 13. The temperature detector 14 functions as malfunction detecting means related to a thermal destruction (damage) of the semiconductor switch element 12.

The nonreturn-type switch (thermo-fuse) 11 and the semiconductor switch element (MOS-FET) 12 are blown out or turned off by a switch control circuit for detecting the overdischarge of the rechargeable battery 1, the overcharge of the rechargeable battery 1, and the malfunction of the semiconductor switch element 12. To be concrete, the switch control circuit includes a voltage detector 15 for detecting terminal voltage Vbat of the rechargeable battery 1 and cell voltages Vcell of the battery cells 2 that construct the rechargeable battery 1. The voltage detector 15 detects the overcharge and overdischarge of the rechargeable battery 1. That is to say, the voltage detector 15 functions as means for detecting malfunctions including overcharge, overdischarge, etc.

The voltage detector 15 detects the overcharge of the rechargeable battery 1, for example, by checking if the terminal voltage Vbat of the rechargeable battery 1 is higher than predetermined charge voltage and also if terminal voltages Vcell of the battery cells 2 connected in series are higher than predetermined cell voltage. When the terminal voltage Vbat of the rechargeable battery 1 or the terminal voltages Vcell of the battery cells 2 are higher than the predetermined voltage, the voltage detector 15 determines that the rechargeable battery 1 is overcharged, and outputs an overcharge detection signal as a malfunction signal.

The overcharge detection signal is applied to a switch element 17 through an OR circuit 16 mentioned below. By turning on the switch element 17, the internal heater of the nonreturn-type switch 11 is turned on, and the nonreturn-type switch 11 is blown out, since the fuse in the nonreturn-type switch 11 is melt by the heat of the internal heater by the current. The blowout of the nonreturn-type switch 11 interrupts the charging line 3 and permanently forbids a further charge of the rechargeable battery 1. The switch element 17 is made up of a mechanical switch, such as a semiconductor switch and a relay-type switch, which is capable of flowing current required for the blowout of the nonreturn-type switch 11.

The voltage detector 15 detects overcurrent of the rechargeable battery 1, for example, by detecting discharge current I of the rechargeable battery 1 from voltage generated in both ends of a shunt resistance 18 interposed in the discharging line 5 in series. When the discharge current I is higher than predetermined rated current, the voltage detector 15 determines that the rechargeable battery 1 is in an overcurrent state, and outputs an overdischarge detection signal. The voltage detector 15 makes a determination as to whether the terminal voltage Vbat of the rechargeable battery 1 and the cell voltages Vcell of the battery cells 2 are reduced to voltage that enables recharge of the rechargeable battery 1 (battery cells 2). When the terminal voltages Vbat and Vcell are reduced to guaranteed minimum voltage, the voltage detector 15 outputs the overdischarge detection signal in order to prevent a deep discharge. The voltage detector 15 applies the overdischarge detection signal to the gate of the semiconductor switch element 12, and turns off (interrupts) the semiconductor switch element 12, to thereby interrupt the discharging line 5 and forbid a further discharge of the rechargeable battery 1.

The temperature detector 14 detects abnormal heat generation of the semiconductor switch element 12 from the output of the thermo-sensor 13. For example, if temperature of the FET rises to 130 degrees centigrade that is slightly lower than 150 degrees centigrade that is guaranteed operation temperature of the FET, the temperature detector 14 determines that as an operation malfunction. When the temperature detector 14 detects a malfunction of the semiconductor switch element 11, the temperature detector 14 outputs a malfunction detection signal through the OR circuit 16 to turn on the switch element 17, and thereby blows out the nonreturn-type switch 11. Stated differently, when the overcharge of the rechargeable battery 1 is detected or when the malfunction of the semiconductor switch element 12 is detected, the nonreturn-type switch 11 is blown out to interrupt the charging line of the rechargeable battery 1.

Malfunctions of the rechargeable battery device include a case in which at least one of the battery cells 2 reaches reference overcharge voltage, which is detected by monitoring the voltages Vcell of the battery cells 2, and the like. However, the malfunctions may be other than such malfunction. The malfunction detecting means may be embodied as a software function of a microprocessor that gains information including the voltage, current and temperature of the rechargeable battery 1, etc. When it is determined that a malfunction is detected in the microprocessor, a malfunction signal is produced to turn on the switch element 17 as described above. Subsequently, the internal heater of the nonreturn-type switch 11 is turned on, and the nonreturn-type switch 17 is blown out.

According to the rechargeable battery device thus constructed, in the event of a malfunction of the rechargeable battery device, the nonreturn-type switch 11 is blown out to interrupt the charging line 3, for example, when the rechargeable battery 1 is overcharged. It is then possible to reliably prevent a further charge of the rechargeable battery 1 and ensure the safety thereof. Moreover, since the discharging line 5 is arranged independently from the charging line 3, the electric energy charged in the rechargeable battery 1 can be recovered to be supplied to the load. As a result, the energy can be effectively used. The overcharge of the rechargeable battery 1 is attributable entirely to deterioration of battery performance (life duration) thereof. The rechargeable battery 1 that is overcharged ends up being discarded. At this time, the charged energy of the rechargeable battery 1 can be discharged through the discharging line 5 independent from the charging line 3 as described above, so that there is provided a secondary effect such as securing of safety in disposal.

According to the device, when the semiconductor switch element 12 fails to operate properly, the nonreturn-type switch 11 is also blown out as described above. Therefore, it is possible to prevent the rechargeable battery 1 from being recharged and used while the semiconductor switch element 12 remains broken. Consequently, for example, even if the rechargeable battery device is one used for an electronic device whose rated discharge current is as high as 15 A, and the nonreturn-type switch 11 suitable to this rated discharge current does not exist, which makes it impossible to provide the nonreturn-type switch 11 to the discharging line 5, the rechargeable battery device can be reliably prevented from being reused if the nonreturn-type switch 11 provided to the charging line 3 is blown out.

According to the rechargeable battery device thus constructed, the rechargeable battery device can self-resolve malfunctions thereof due to the foregoing functions provided to the rechargeable battery device without transmitting a malfunction signal or the like to the charger through the communication means and controlling the charge and discharge of the rechargeable battery at the charger side. Since it is possible to resolve malfunctions of the rechargeable battery 1 and the like with the simple structure, the rechargeable battery device is very preferable in case that the rechargeable battery device is embodied as a disposable battery pack, for the reason, for example, that costs of the device can be reduced.

The present invention is not limited to the above embodiment. For instance, the number of the battery cells 2 that are connected in series/parallel and construct the rechargeable battery 1 may be determined according to power specification of the load. As the voltage detector 15, various voltage detectors that have conventionally been proposed may be properly utilized. In short, various modifications can be made without deviating from the gist of the invention.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rechargeable battery device comprising a rechargeable battery and a protection circuit for protecting the rechargeable battery from overcharge and overdischarge, wherein
   the rechargeable battery device has a charging/discharging line, a charging line and a discharging line for the rechargeable battery, which are all arranged independently from each other;
   the protection circuit includes a nonreturn-type switch that is interposed in the charging line in series and interrupts the charging line by blowout;
   a semiconductor switch that is interposed in the discharging line in series and electrically continues or interrupts the discharging line; and
   a switch control circuit that turns off the semiconductor switch element when detecting overdischarge of the rechargeable battery, and blows out the nonreturn-type switch when detecting a malfunction of the rechargeable battery device.

2. The rechargeable battery device according to claim 1, wherein the semiconductor switch element is a MOS-FET, and the nonreturn-type switch is a thermo-fuse.

3. The rechargeable battery device according to claim 1, wherein a malfunction of the rechargeable battery device is a malfunction of the semiconductor switch element, and is detected by measuring heat temperature of the semiconductor switch element which is obtained by using a thermo-sensor provided to the semiconductor switch element.

4. The rechargeable battery device according to claim 1, including as external connection terminals:
a charging terminal connected to one electrode of the rechargeable battery through the charging line, a discharging terminal that is connected to the one electrode of the rechargeable battery through the discharging line and arranged independently from the charging terminal, and a common terminal that is connected to the other electrode of the rechargeable battery and makes a pair both with the charging terminal and the discharging terminal.

* * * * *